Nov. 12, 1968 — H. STAHLECKER — 3,410,075
SPINDLE BEARING UNIT
Filed Jan. 18, 1966 — 4 Sheets-Sheet 1

INVENTOR
HANS STAHLECKER

BY Dicke & Craig
ATTORNEYS

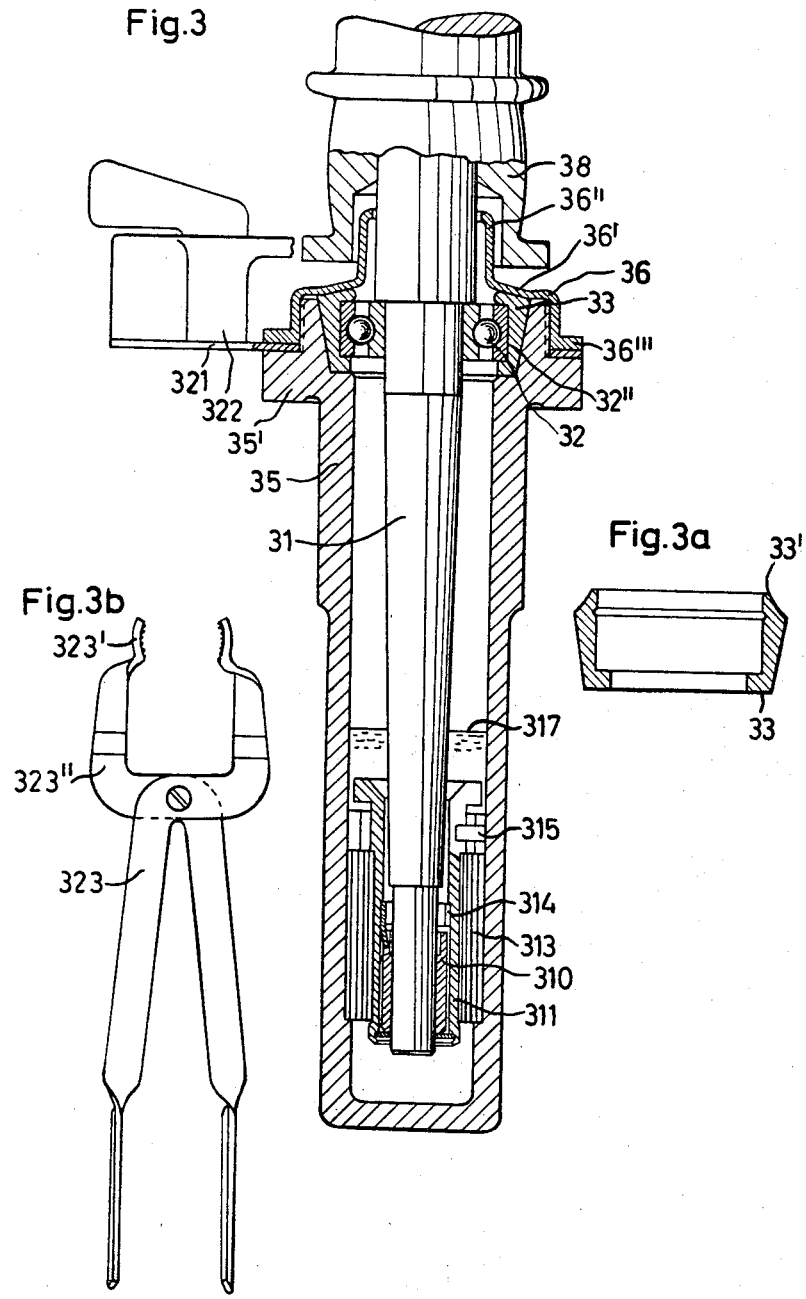

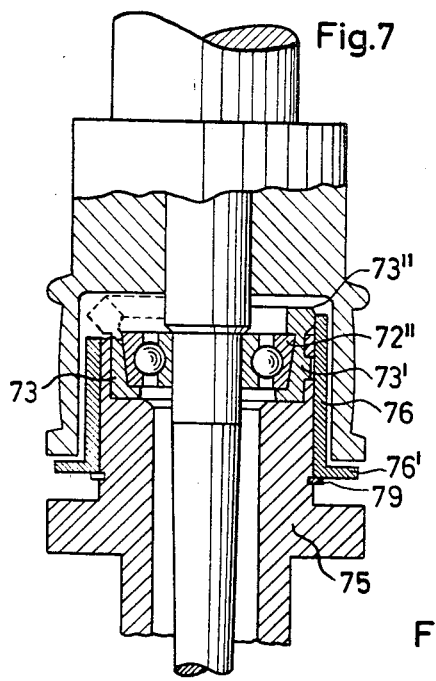
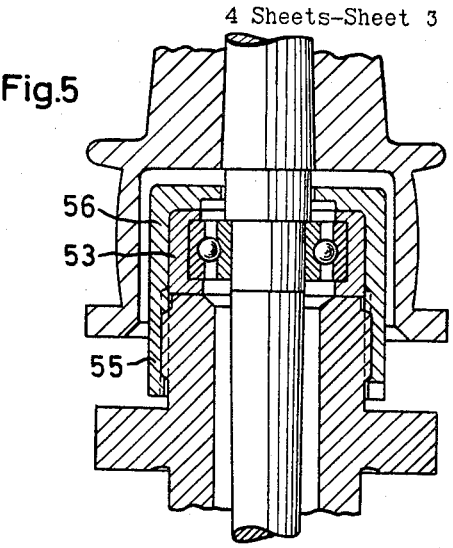
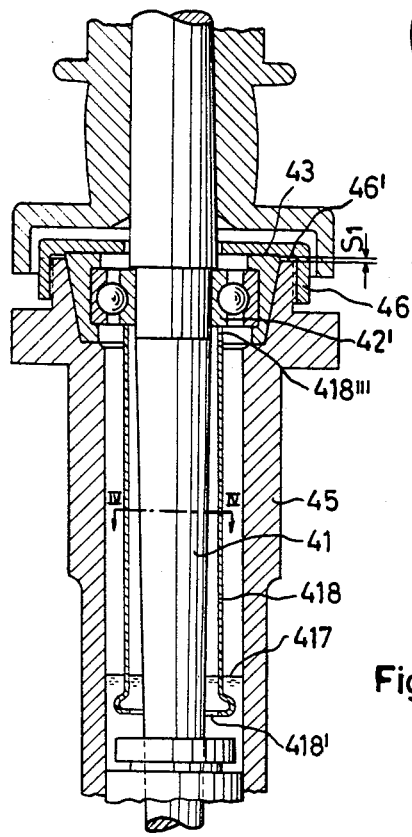
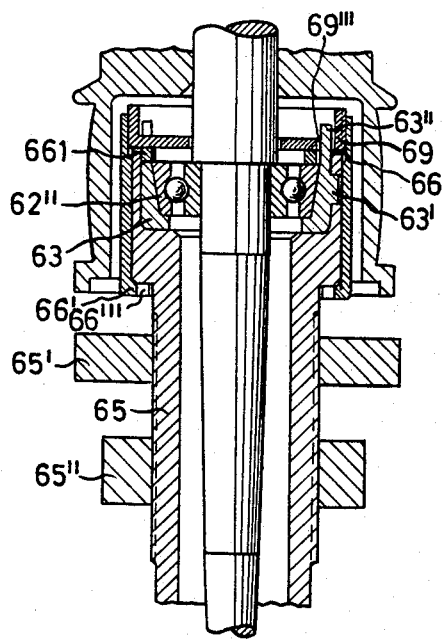

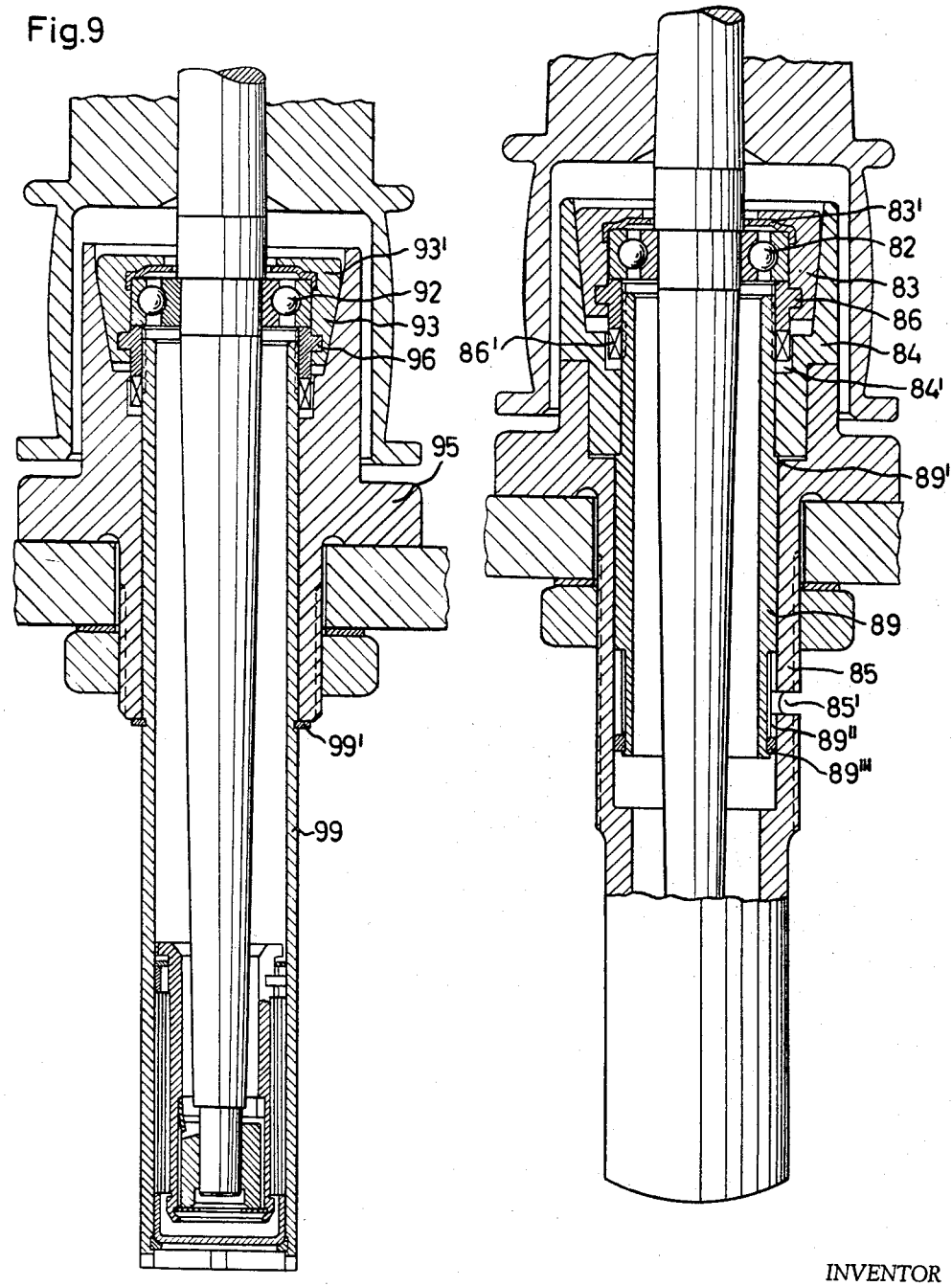

United States Patent Office 3,410,075
Patented Nov. 12, 1968

3,410,075
SPINDLE BEARING UNIT
Hans Stahlecker, Sussen, Wurttemberg, Germany, assignor to Spindelfabrik Sussen, Schurr, Stahlecker & Grill G.m.b.H., Sussen, Wurttemberg, Germany
Filed Jan. 18, 1966, Ser. No. 521,258
Claims priority, application Germany, Jan. 28, 1965, S 95,214
11 Claims. (Cl. 57—135)

ABSTRACT OF THE DISCLOSURE

A spindle bearing unit for a spindle of a spinning or twisting machine which is provided with an antifriction neck bearing which is surrounded by a damping sleeve consisting of an elastic material, and with a footstep bearing for guiding the lower end of the spindle in radial directions. The bearings are separate from each other with the neck bearing being axially secured to and for removal with the spindle. A locking ring is screwed to the spindle housing for locking the neck bearing and spindle axially in one position and for operation from below the whirl for movement into a second position that releases the spindle and neck bearing for removal from above.

Background of the invention

There are bearing units for spindles known of the type in which the neck bearing in the form of a ball bearing is surrounded by a damping sleeve of an elastic material which is mounted in a bearing sleeve within the bearing housing which also contains the footstep bearing in the form of a friction bearing, and in which the bearing sleeve may have a lower part which is elastic in radial directions. The damping sleeve of this known spindle bearing is held within the bearing sleeve by a threaded ring which is screwed from above upon this sleeve and may be unscrewed therefrom by means of a pin which is inserted into bores in the spindle whirl so that the spindle together with its neck bearing may then be removed from the bearing sleeve. One of the disadvantages of this known spindle consists in the fact that it requires an expensive common bearing sleeve for the neck and footstep bearings which also renders the provision of damping means very difficult. Furthermore the bores in the bell-shaped whirl act like the channels of a centrifugal blower so that during the operation of the spindle a continuous air current is produced between the lower edge and the upper part of the whirl. This air current carries fly into the whirl which may then accumulate therein and interfere with the rotation of the spindle. The bores in the whirl may also harm the driving belt and reduce its useful length of service.

Although there are other known spindle bearing units, in which the neck bearing in the form of an antifriction bearing is located in a damping sleeve of an elastic plastic and is mounted in the bearing housing of the spindle separately from the footstep bearing, the footstep bearing consists of an antifriction bearing of a type which requires a special damping sleeve of an elastic material. It is also difficult to provide this antifriction bearing with a lubricant in accordance with its particular requirements of operation. Furthermore, the operations of installing and exchanging the special damping sleeve when necessary are very difficult. The securing means for preventing the spindle shaft from being unintentionally withdrawn are provided either within the footstep bearing where they must be accessible from the outside or they consist merely of outer securing means which have well-known disadvantages, especially of collecting fly and of requiring to be cleaned.

Summary of the invention

It is an object of the present invention to provide a spindle bearing unit which comprises a neck bearing in the form of a ball bearing and does not possess the disadvantages of the known spindle bearings of this type. According to the invention, this object is attained by providing the footstep bearing for the cylindrical lower end of the spindle in the form of a friction bearing which runs in oil and forms within the bearing housing an element separate from the neck bearing, and by providing the neck bearing in the form of a ball bearing which is fixed on the spindle and may be withdrawn from the bearing housing together with the rotary parts after a securing or locking element has been actuated. The friction bushing of the footstep bearing is then preferably mounted in a sleeve which has a conical bottom and is supported by the latter in the axial direction on the bearing housing. A further improved embodiment of the invention provides that the sleeve containing the footstep bearing is surrounded by a spirally wound damping element which may be of a type known as such and is radially guided within the bearing housing and supports the mentioned sleeve. This embodiment of the invention is especially suitable for spindles which should run as quietly as possible.

In order to be able to supply the normally greased ball bearing from time to time with small amounts of oil, a lubricating tube may be provided which consists of plastic and is adapted to conduct the oil from the oil chamber of the footstep bearing to the neck bearing. It is then advisable to mount this lubricating tube on the spindle shaft and to provide it with interior channels through which the oil may be conducted to the neck bearing.

According to a further embodiment of the invention, the locking element for preventing the rotary parts from being unintentionally withdrawn from the bearing housing may be provided in the form of a locking ring which may be acted upon from the lower side of the spindle whirl. This locking ring is then preferably designed so as to clamp the damping sleeve surrounding the neck bearing tightly against the bearing housing and/or against the outer race of the neck bearing. It is further advisable to provide the locking ring in the form of a threaded ring which is screwed upon the bearing housing and may at the same time serve for securing brake means for the spindle to the bearing housing.

An especially simple and effective damping of the neck bearing may be attained by inserting the outer race of the neck bearing into an upwardly open bore of the damping sleeve which has an upwardly extending projection thereon on which during the operation of the spindle is pressed inwardly by the locking ring so as to hold the outer race within the damping sleeve. The locking ring may also be provided in the form of a threaded sleeve which may be slipped from below over the bearing housing and be screwed together with a threaded disk which presses from above upon the damping sleeve. In certain cases, for example, in order to permit a whirl with a small diameter and a very simple neck bearing to be employed, it is possible to design the locking ring which engages over the damping sleeve of the neck bearing so as to serve at the same time as a housing for the damping sleeve. The locking ring may then be operated by means of a suitable wrench or by tongues which engage into grooves or similar recesses or on flattened surfaces on the locking ring. For maintaining the spindle bearing in a clean condition and for attaining a closed structural unit, it is, however, especially advisable to provide the threaded locking ring underneath the whirl with a flange which has a smooth cylindrical outer surface and permits special tongues to be applied thereon from opposite sides.

A further embodiment of the invention provides, especially for reducing the required space and for facilitating the assembly and disassembly of the spindle bearing, that the locking element may be operated by means of a sleeve which is provided at the inside of the bearing housing. The locking element at the inside of the bearing housing is then preferably provided in the form of a threaded ring which, by means of a threaded sleeve engaging with this ring, is adapted to clamp the damping sleeve together with the bearing housing. The sleeve which is adapted to actuate the locking element may also be designed so as to form a part of the bearing housing in which the footstep bearing is mounted.

Brief description of the drawing

The features and advantages of the present invention will become more clearly apparent from the following detailed description thereof which is to be read with reference to the accompanying drawings, in which

FIGURE 3 shows a longitudinal section of a spindle bearing unit similar to that according to FIGURE 1, in which, however, the damping sleeve which surrounds the ball bearing is directly inserted into the bearing housing, while the footstep bearing is mounted in a sleeve which is surrounded and braced by a spirally wound, oil-submerged coil spring;

FIGURE 3a shows a longitudinal section of the damping sleeve according to FIGURE 3 before being installed;

FIGURE 3b shows an elevation of the tongs for turning the locking ring according to FIGURE 3, but on a smaller scale than that of FIGURE 3;

FIGURE 4 shows a longitudinal section of a neck bearing arrangement similar to that according to FIGURE 3, but in which the locking ring is not provided with a sleeve surrounding the spindle shaft, and which is provided with a lubricating tube;

FIGURE 4a shows a cross section which is taken along the line IV—IV of FIGURE 4;

FIGURE 5 shows a longitudinal section of a neck bearing arrangement similar to that according to FIGURE 1, but in which the damping sleeve is mounted within the locking ring;

FIGURE 6 shows a longitudinal section of a neck bearing arrangement, in which the locking ring consists of a threaded sleeve which may be slipped from below over the bearing housing and be screwed upon a threaded disk which is located above the damping sleeve;

FIGURE 7 shows a longitudinal section of a neck bearing arrangement, in which the locking ring consists of a sliding sleeve which acts upon the damping sleeve which is provided with radially movable parts;

FIGURE 8 shows a longitudinal section of a spindle bearing unit, in which the locking element consists of a locking ring which is provided at the inside of the bearing housing and may be operated by means of a sleeve which is located within the bearing housing and is accessible from the outside at a point underneath the spindle nut; while FIGURE 9 shows a longitudinal section of a spindle bearing unit similar to that as shown in FIGURE 8, but in which the sleeve for operating the locking ring also forms a part of the bearing housing and contains the footstep bearing.

Detailed description of the drawing

Figure 1:
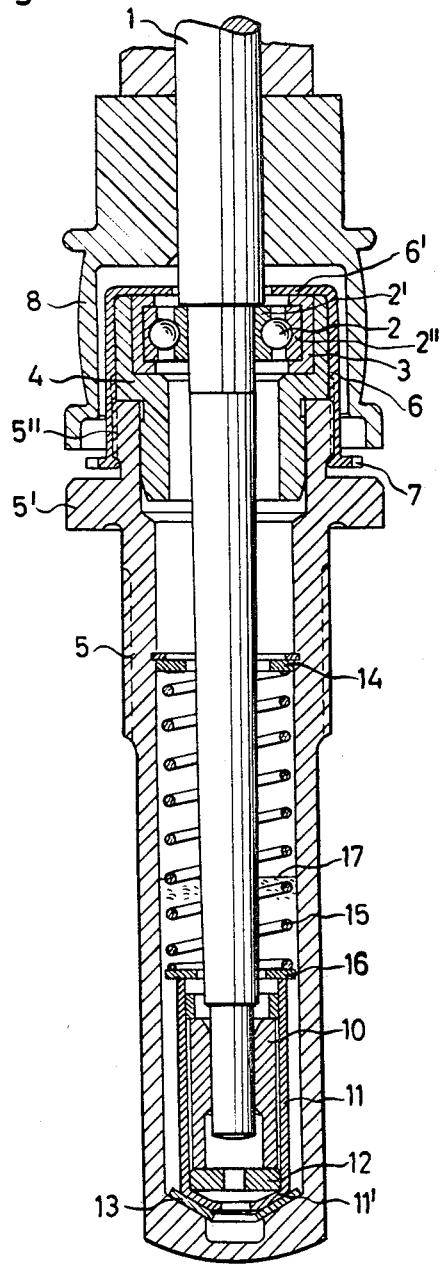
FIGURE 1 shows a longitudinal section of a spindle bearing unit which is provided with a separate bearing head and within this head with a damping sleeve for the neck ball bearing, and with a locking ring which may be screwed together with the bearing housing and engages over the damping sleeve, while the footstep bearing is mounted in a closed bearing housing and is surrounded by a damping sleeve which is supported on a conical washer.

In the drawings, FIGURE 1 illustrates a spindle shaft 1 upon which the inner race 2' of a neck bearing 2 in the form of a ball bearing is tightly pressed. The outer race 2" is mounted in a damping sleeve 3 which, in turn, is mounted in a bearing head 4. This bearing head 4 is pressed into the bearing housing 5, the upper part of which is provided above the flange 5' with an outer screw thread 5" upon which a locking ring 6 is screwed which has on it upper end an inwardly projecting flange which engages over the damping sleeve 3. The lower, outwardly projecting flange of the locking ring 6 is provided with grooves 7 into which a tool may engage which is applied underneath the bell-shaped whirl 8 for turning the locking ring 6. The footstep bearing 10 which guides the lower end of the spindle in radial directions is inserted with a small amount of radial play into a socketlike sleeve 11 and rests on a washer 12. Sleeve 11 which acts as a damping sleeve is inserted with considerable radial play into the bearing housing 5 and its conical bottom 11' is supported in the axial direction by means of an intermediate conical washer 13 on the bottom of the bearing housing. A coil spring 15, the upper end of which acts against a washer 14 which is held in the bearing housing 5 by a spring ring, acts with its lower end upon a washer 16 and thereby presses the footstep-bearing sleeve 11 with a light pressure upon the conical washer 13 which serves as brake surface. This footstep-bearing arrangement which is disposed within an oil bath, the upper surface of which is located at a level 17 above the washer 16, provides a combined oil damping effect between the footstep bearing 10 and the damping sleeve 11 and a frictional damping effect between the footstep bearing 10 and the supporting washer 12 and between the damping sleeve 11 and the conical washer 13. This bearing arrangement results in a very reliable damping and centering and may be easily installed as a structural unit which may be made of the most suitable dimensions in accordance with the particular requirements of the operation of the spindle. In connection with the neck ball bearing 2, this footstep bearing unit insures an excellent rotation and centering of the spindle even when the latter is heavily loaded. It is also of advantage that the head 4 of the neck bearing extends so far into the bell-shaped whirl 8 that the plane of the tension of the driving belt will extend substantially through the center of the neck bearing.

Figure 2:
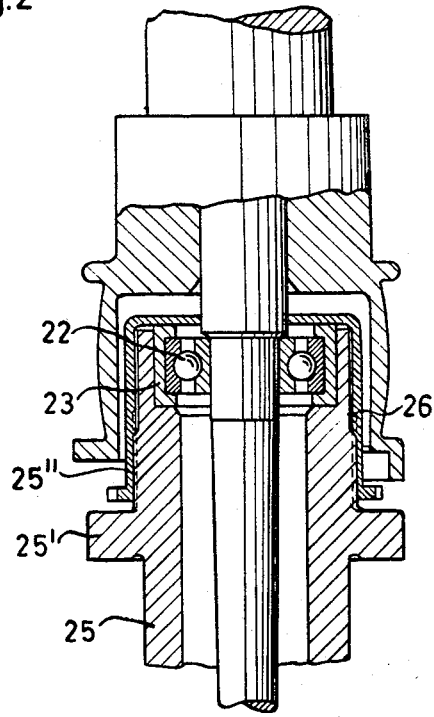
FIGURE 2 shows a longitudinal section of a neck bearing arrangement similar to that as shown in FIGURE 1, but provided with a damping sleeve which is inserted directly into the bearing housing.
Figure 2A:
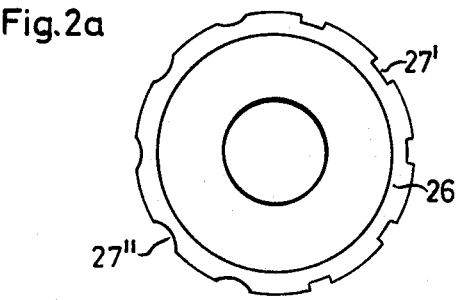
FIGURE 2a shows a plan view of the locking ring according to FIGURE 2.

FIGURE 2 illustrates a modification of the neck bearing in which the damping sleeve 23 which surrounds the neck bearing 22 is mounted directly in the bearing housing 25. The upper end of the bearing housing 25 above the flange 25' is provided with a screw thread 25" upon which the locking ring 26 is screwed. As shown in FIGURE 2a, the lower flange on the locking ring 26 may be provided either with rectangular grooves 27' or with concave grooves 27" for applying a suitable tool for turning the locking ring. The rectangular grooves 27' permit the application of a one-sided turning wrench, while a locking ring with concave grooves 27" or with plane contact surfaces, not shown, requires a tool which acts upon both sides.

In FIGURE 3, the neck bearing 32 is located on the spindle shaft 31 underneath the whirl 38 and mounted in a damping sleeve 33 with a conical outer surface. Before being installed, this damping sleeve 33 has a cylindrical bore with a projection 33' thereon, as shown in FIGURE 3a, which, when the damping sleeve is installed in the bearing housing 35, is bent inwardly to the position as shown in FIGURE 3 by the threaded locking ring 36 which is provided for this purpose with a conical surface 36', whereby the outer race 32" of the neck bearing will be tightly clamped together with the damping sleeve 33. The conical surface 36' of the locking ring is extended upwardly to form a sealing sleeve 36" which projects into the whirl 38. The lower flange 36'" of the locking ring has a smooth cylindrical outer surface which in the operation engages upon the flange 35' of the bearing housing 35 but may, if desired, be separated therefrom by a mounting flange 321 of a spindle brake 322 in the manner as shown.

For turning the locking ring, special tongs 323 are employed, as shown in FIGURE 3b, the curved clamping ends 323' of which may be applied around the flange 36''' of the locking ring. These clamping ends may in addition be provided with a friction coating or be serrated. In order to prevent the brake 322 from interfering with the operation of the tongs 323, the tong arms are provided with bent parts 323'' through which the tongs will be spaced at a sufficient distance from the brake 322.

The footstep bearing 310 of the spindle is easily movable in radial directions within the sleeve 311 which is supported on the inner winding of a spirally wound spring 313 of a type which is known as such, the outer winding of which acts against the bearing housing 35. The locking rings 314 and 315 serve as means for preventing the footstep bearing 310 from turning within the sleeve 311 and also the sleeve 311 from turning within the housing 35. This footstep-bearing unit which is submerged in oil which reaches to a level 317 has a very effective oil-damping action and, in combination with the neck ball bearing which is mounted independently therefrom in the bearing housing, it insures a smooth and perfect run of the spindle, even if the latter rotates at a very high speed.

In the spindle bearing according to FIGURE 4, the threaded locking ring 46 which overlaps the outwardly conical damping sleeve 43 is provided with an inner shoulder 46' which limits the extent of the movement of ring 46 in the downward direction by engaging upon the bearing housing 45. The damping sleeve 43 and the corresponding contact surfaces in the bearing housing 45 are, however, made of such dimensions that during the operation of the spindle there is still a small gap $S_1$ between the shoulder 46' and the bearing housing 45 when the damping sleeve 43 is pressed under the elastic tension into its conical seat. If necessary, this small gap $S_1$ permits the threaded ring to be further tightened until the shoulder 46' engages directly upon the bearing housing. This further tightening may serve for changing the damping conditions or for readjusting the elastic tension when it is no longer the same as it was originally due to the long use of the damping sleeve.

The spindle shaft 41 carries an oil tube 418 which consists of plastic and projects downwardly through the oil surface 417 into the oil chamber of the footstep bearing. This oil tube is slightly enlarged at its lower end and provided with openings 418', and by means of ribs it is divided into oil channels 418''. At its upper end, the oil tube 418 engages upon the inner race 42' of the neck bearing. When the spindle starts to rotate, the oil tube produces a small pumping effect whereby a small amount of oil is forced through the lower openings 418', the channels 418'', and the upper openings 418''' into the ball bearing. However, when the spindle rotates at full speed, the oil tube which is smooth on its outside no longer produces any pumping effect.

According to FIGURE 5, the damping sleeve 53 engages upon the upper end surface of the bearing housing 55 and is mounted directly in and clamped to the locking ring 46 which is screwed to the bearing housing.

In FIGURE 6, the bearing housing 65 is provided with a screw thread upon which a threaded flange 65' as well as the spindle nut 65'' is screwed. The damping sleeve 63 which is mounted within the bearing housing is prevented from being unintentionally turned or removed by means of projections 63' which engage into corresponding recesses in the bearing head. The locking ring 66 is slipped from below upon the bearing housing until its flange 66' engages upon a shoulder on the housing wall. The upper part of the bore in the locking ring is provided with an inner screw thread into which a cup-shaped member 69 is screwed which presses upon the outer race 62'' of the neck bearing either directly or, in the manner as shown, by means of an elastic pressure ring 661. This threaded member 69 is provided with apertures 69''' through which corresponding projections 63'' on the damping sleeve engage so as to prevent the member 69 from being turned. The locking ring may be gripped underneath the whirl by means of special tongs which engage into recesses 66''' in the flange 66' of the locking ring so as to permit the latter to be turned. In order to permit the neck bearing which is mounted on the spindle shaft to be easily reinserted into the damping sleeve after the bearing unit has been disassembled, the outer race 62'' of the neck bearing is provided with a conical outer surface which fits into the conical bore of the damping sleeve 63.

The damping sleeve 73 according to FIGURE 7 is locked in the bearing housing 75 by means of projections 73' in a similar manner as shown in FIGURE 6, and it is provided on its upper end with radially movable segments 73'' which in the operative position are prevented from bending outwardly by the locking ring 76 so that the outer race 72'' will then be prevented from being pulled axially in the upward direction. If the spring ring 79 is removed, the locking ring 76 may be pushed downwardly by means of a tool acting upon the flange 76', whereby the segments 73'' will be released in radial directions and will then move to the position as indicated in dotted lines at the left side of the drawing, so that the outer race 72'' and thus also the spindle together with the neck bearing may be pulled out in the upward direction. The outer race 72'' is again provided with a conical outer surface in the same manner as described with reference to FIGURE 6. It may, however, also be provided with a cylindrical outer surface which fits into a corresponding cylindrical bore in the damping sleeve 73. Also in this case the rotary parts may be easily withdrawn from the bearing housing if the bore is made of a sufficiently large diameter so as to release the outer race after the segments 73'' are radially expanded and no longer hold this race.

In FIGURE 8, the neck bearing 82 is inserted into the damping sleeve 83 which fits over the neck bearing and may in addition be provided with a separate sealing gasket 83' which is inserted therein. The lower part of the damping sleeve 83 contains a threaded locking ring 86 which has locking projections 86' engaging into recesses 84' in the bearing head 84 which is mounted in the bearing housing 85, so that this locking ring is prevented from turning. The threaded sleeve 89 which is slidable and rotatable within the bearing housing 85 is screwed together with the locking ring 86 and thereby clamps the damping sleeve 83 tightly to the bearing head 84. The shoulder 89' on sleeve 89 then engages against the bearing head 84. In order to permit the threaded connection between the locking ring 86 and the threaded sleeve 89 to be loosened, the latter is provided with a series of grooves 89'' into which a tool may engage which may be inserted through one or two slots 85' in the bearing housing for the purpose of turning the threaded sleeve 89. A sealing ring 89''' seals the inside of the bearing housing toward the slots 85'.

The damping sleeve 93 according to FIGURE 9 is of a similar construction and similarly installed as the damping sleeve according to FIGURE 8 and it is held within the bearing housing 95 by the threaded locking ring 96 being drawn downwardly by the threaded sleeve 99 until the spring ring 99' on sleeve 99 engages against the bearing housing 95. The lower part of the sleeve 99 serves at the same time as a housing for the footstep bearing. Sleeve 99 may be pulled downwardly out of the bearing housing 95 after the parts are unscrewed from each other, whereby the rotary elements including the neck bearing 92, the damping sleeve 93, and the locking ring 96 may be withdrawn in the upward direction.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A spindle bearing unit for a spinning or twisting machine comprising a spindle, a tubular housing having a closed lower end, the lower part of said housing constituting chamber means to be filled with oil, a bell-shaped whirl axially and radially fixed to said spindle radially spaced from and surrounding the upper part of said housing, a neck bearing within the upper part of said housing and consisting of an anti-friction bearing having an inner race and an outer race, said inner race surrounding and being axially and radially fixed to said spindle, a damping sleeve consisting of a relatively highly elastic material surrounding said outer race and interposed between said outer race and said housing, a footstep friction bearing mounted within said oil-filled lower part of said housing independently of said neck bearing for radially guiding the lower end of said spindle, and a releasable locking means on the upper part of said housing movable between a locking position to axially maintain the lower part of said spindle together with said neck bearing within said housing and a released position to permit said spindle together with said neck bearing to be withdrawn from said housing, said locking means being a locking ring having engageable means for moving it between its positions and located below said bell-shaped whirl.

2. A spindle bearing unit as defined in claim 1, in which said closed lower end of said housing has a conical inner bottom surface, said footstep bearing comprising a socket-like sleeve having a conical lower end and engaging in the axial direction upon said bottom surface, and a friction bushing on the lower end of said spindle and mounted within said sleeve.

3. A spindle bearing unit as defined in claim 1, in which said footstep bearing comprises a friction bushing, a sleeve surrounding and connected to said bushing, and a spirally wound damping element surrounding and supporting said sleeve and, in turn, supported in radial directions by the wall of said housing.

4. A spindle bearing unit as defined in claim 1, in which said locking means is adapted to clamp said damping sleeve surrounding said neck bearing elastically against the wall of said housing and against said outer race of said neck bearing.

5. A spindle bearing unit as defined in claim 4, in which the upper end of said housing has an outer screw thread, said locking ring covering said damping sleeve and having a downwardly projecting rim with an inner screw thread adapted to be screwed upon said threaded end of said housing and to press upon the upper end of said damping sleeve.

6. A spindle bearing unit as defined in claim 5, in which said elastic damping sleeve has an upwardly projecting extension adapted to be bent over inwardly and upon the upper end of said outer race by said locking ring when said ring is screwed upon the upper end of said housing so as to secure said outer race within said damping sleeve.

7. A spindle bearing unit as defined in claim 1, in which said locking ring comprises an externally threaded disk-shaped ring surrounding said spindle above said neck bearing and said damping sleeve, and an internally threaded tubular part adapted to be slipped from below over said housing and to be screwed together with said ring so that said ring will then be drawn downwardly so as to press from above at least upon said damping sleeve.

8. A spindle bearing unit as defined in claim 1, in which said locking ring forms an inverted cup-shaped casing enclosing said damping sleeve and having a central aperture in its bottom through which said spindle extends and being screwed by means of associated outer and inner screw threads upon the upper end of said housing, the bottom of said casing being adapted to press upon the upper end of said damping sleeve.

9. A spindle bearing unit as defined in claim 5, in which said rim of said threaded locking ring has a substantially cylindrical outer surface located underneath said whirl and being freely accessible from the outside to permit said locking ring to be screwed upon and unscrewed from said housing by means of a suitable clamping tool.

10. A spindle bearing unit, according to claim 1, wherein said damping sleeve is removably secured to said outer race and axially slidable within said upper part, said locking means comprising a locking ring in said upper part of said housing and secured to said damping sleeve, and a tubular member extending from an intermediate part of said housing between said two bearings upwardly along the inside of said housing and into said locking ring, associated means on said locking ring and said upper part of said housing for connecting said locking ring to said upper part so as to be axially slidable but nonrotatable relative thereto, said locking ring and the upper end of said tubular member having inner and outer screw threads for moving said locking ring together with said damping sleeve in the axial direction when said tubular member is turned about its axis, said intermediate part of said housing having at least one slot through which a tool may be applied from the outside upon the lower end of said tubular member for turning the same in one direction to clamp said damping sleeve and said outer race to said housing and for turning said tubular member in the opposite direction to release said damping sleeve and said outer race from said housing and then to permit said spindle together with said neck bearing to be withdrawn from said housing.

11. A spindle bearing unit, according to claim 1, wherein said housing consists of a tubular outer housing part adapted to be mounted in a fixed position and a substantially cylindrical tubular member inserted into said outer housing part and projecting downwardly therefrom and having a screw thread on its upper end, means for closing the lower end of said tubular member, the lower part of said tubular member receiving the oil and forming said chamber means, said damping sleeve being interposed between said outer race and the surrounding wall of said outer housing part and being removably secured to said outer race and axially slidable within said outer housing part, said locking means comprising an internally threaded locking ring secured to said damping sleeve and adapted to be screwed upon the threaded upper end of said tubular member, associated means on said locking ring and on said outer housing part for connecting said locking ring to said outer housing part so as to be axially slidable but nonrotatable relative thereto so that, when said tubular member is turned about its axis in one direction, said locking ring together with said damping sleeve are moved in the axial direction and said damping sleeve and said outer race are clamped to said outer housing part and, when said tubular member is turned in the opposite direction, said locking ring and said outer race are releaseable from said outer housing part and then permit said spindle together with said neck bearing to be withdrawn from said housing.

References Cited

UNITED STATES PATENTS

| | | | |
|---|---|---|---|
| 2,556,317 | 6/1951 | Cook | 308—143 |
| 2,777,739 | 1/1957 | Beerli | 308—149 |
| 2,908,533 | 10/1959 | Schurr et al. | 308—152 |
| 2,986,432 | 5/1961 | Schlauch | 308—184 |
| 3,316,036 | 4/1967 | Bligard et al. | 308—184 |
| 2,068,652 | 1/1937 | Brull | 308—228 |
| 2,609,254 | 9/1952 | Harris | 57—135 |
| 2,750,237 | 6/1956 | Fink et al. | 308—154 |
| 3,153,314 | 10/1964 | Hammond | 308—228 |

FOREIGN PATENTS 557,952  5/1923  France.

MARTIN P. SCHWADRON, *Primary Examiner.*

FRANK SUSKO, *Assistant Examiner.*